US005640630A

United States Patent [19]
Hattan

[11] Patent Number: 5,640,630
[45] Date of Patent: Jun. 17, 1997

[54] MULTI-STAGE FOCUS PHOTOGRAMMETRIC BOX CAMERA

[76] Inventor: Mark Hattan, 707 E. Tularosa, Orange, Calif. 92666

[21] Appl. No.: 427,138

[22] Filed: Apr. 24, 1995

[51] Int. Cl.⁶ .................................................. G03B 17/02
[52] U.S. Cl. ........................ 396/342; 396/350; 396/437
[58] Field of Search .................................. 354/160, 189

[56] References Cited

U.S. PATENT DOCUMENTS

| 154,607 | 9/1874 | Holmes | 354/189 |
|---|---|---|---|
| 3,825,938 | 7/1974 | Koch | 354/160 |
| 4,733,257 | 3/1988 | Ziegler | 354/189 |
| 5,289,215 | 2/1994 | Clairmont et al. | 354/189 |

Primary Examiner—David M. Gray
Attorney, Agent, or Firm—John E. Vanderburgh

[57] ABSTRACT

A multi-stage focus box camera is disclosed which comprises a tubular body open at both ends formed of a dimensionally stable, light weight material. A lens board and lens extender assembly slides over one end of the camera body and is adapted for slidingly carrying a lens mount for a lens. A film board fits over the opposite end of the camera body and is adapted to receive a film holder which closes the back side of the body and which defines a film support for sheet film. In addition the film board may include a viewing device, such as a ground glass plate in place of the film board, by which an image may be focused. Both the lens board and lens extender assembly and the film board are slidable on the camera body and are movable between retracted and extended positions to provide different focus stages for the camera. In addition the lens board and lens extender assembly and the film board can be moved on the camera body to position the lens body to adjust the depth of field by slanting these components.

9 Claims, 2 Drawing Sheets

MULTI-STAGE FOCUS PHOTOGRAMMETRIC BOX CAMERA

FIELD OF THE INVENTION

The field of the invention relates to box cameras and in particular to lightweight, dimensionally stable, multistage focus box-cameras suitable for photogrammetric photography.

BACKGROUND OF THE INVENTION

Photogrammetry is the science of obtaining accurate information about an object by recording and measuring photographic images of the object. Photogrammetric methods are used for making surveys and maps employing aerial photography, although surface photography may also be employed for this purpose. Normally, however, aerial photography is preferred since it is possible to survey and map large areas with a minimum of time and effort. Photo surveying is particularly useful in the mapping of remote areas where accessibility is limited.

Conventionally, cameras employed in photogrammetric work are of the box type and normally employ larger size sheet film (8"×10" or 4"×5"). Such box cameras normally employ ground glass viewers under a hood for insuring proper image focus. In box cameras the lens is usually incorporated into a moveable bellows that slides back and forth on a rail or frame allowing the lens to change focus. Such box cameras, which are called technical or viewing cameras, are expensive, heavy and can be difficult to operate and have been used almost exclusively by professional photographers. However, even for professional photographers, the large box cameras are not ideally suited for out of studio photogrammetric operations, such as aerial photography, surveying and mapping, and other field operations because of their weight and lack of durability.

Ideally, cameras employed for aerial photography, surveying and mapping and other photogrammetric work should be dimensionally stable, lightweight, easily operated for accurate focus and be adapted for use of the larger sheet film. Photogrammetry, however, is not limited to the science of surveying or aerial mapping, but has great potential in many types of dimensional control work.

A highly successful photogrammetric box camera is described and claimed in U.S. Pat. No. 4,835,559 granted May 30, 1989 to Mark Hattan. This camera has proven successful for aerial photo surveying where most of the images are at infinity. However, a lightweight dimensionally stable camera finds use in many other fields and even for studio applications where simplicity of operation and ruggedness is needed in a camera to achieve essentially distortion-free images. Accordingly, the lens mount of the camera described in U.S. Pat. No. 4,835,559 has limited forward and rear movement for changing the fixed focus of the camera from infinity to closer distances. A close-up lens can be attached to the main lens for close photography. In another embodiment of the camera described in U.S. Pat. No. 4,835,559, an inner body which carries the lens is movably mounted in the camera housing for telescopic movement within the camera housing to provide variable focusing. A rack and pinion gear assembly is provided for moving the inner body and lens for focusing. However there is no provision in the camera design for altering the depth of field, and minor depth of field adjustment must be supplied with the lens mechanism by opening or closing the lens aperture.

As described in U.S. Pat. No. 4,835,559, the camera components including the camera housing, lens mount and inner body are formed of a dimensionally stable material comprising multiple layers of resin impregnated graphite fabric applied over a core form followed by heating the core and fabric in a mold to cure the resin. This method lends itself to the production of simple shapes, such as the camera housing. However, forming more intricate shapes using this method of production is time consuming and expensive. For example, in U.S. Pat. No. 4,835,559, the cost of the camera housing is substantially increased because the film holder adapter, which is formed integrally with the camera housing and comprises the rear face of the camera housing, is a more complex shape adapted for receiving a film holder.

SUMMARY OF THE INVENTION

According to the invention there is provided a photogrammetric camera that is lightweight, simple to operate and yet rugged enough for field work. The camera is adapted for use of large sheet film, preferably 4"×5" although the design allows for a camera constructed for use of 8"× sheet film. The camera can also be adapted for use of roll film. The camera of the present invention is provided with multi-focus stages to allow accurate focusing from 6 feet in nine stages, 6', 8', 10', 12', 15', 20', 25', 40' and infinity. In addition, the camera of the present invention is adapted for universal depth of field adjustment using the mechanism employed in stage focusing.

The features and advantages of the present invention are achieved by a box camera that comprises a tubular camera body open at both ends formed of a dimensionally stable fiber reinforced resin fabric. A lens board slides over one end of the camera body and is adapted for carrying a lens and shutter assembly. A film board fits over the opposite end of the camera body and is adapted to receive a film holder that closes the back side of the body The film board also defines a film support for sheet film. In addition the film board may include a viewing device, such as a ground glass plate for the film holder, by which an image may be viewed for photo composition. It is unnecessary to employ the ground glass plate for focusing purposes in view of the multi-stage focusing features of the camera. Both the lens board and the film board are slidable on the camera body and are movable between retracted and extended positions to provide different focus stages for the camera. In addition the lens board and the film board can be moved on the camera body to adjust and extend the depth of field by slanting horizontally or vertically. Light seals consisting of compressible, non-binding strips extend around the end portions of the camera body between the interfaces of the film board and camera body and the interfaces of the lens board and the camera body as well as the interfaces of the lens extender and the lens mount.

In the preferred embodiment the camera body is constructed from fiber reinforced resin and is preferably formed by laying up layers of sheets of the fiber reinforced resin in a suitable mold. Fiber reinforced resin is very lightweight and of extremely high strength. In addition, the fiber reinforced resin is dimensionally stable so that it is essentially completely unaffected by temperature changes at the temperature ranges normally encountered in photogrammetric and aerial work. The camera body is, accordingly, subject to very small dimensional changes during the manufacturing process, which changes are predictable and are compensated for by adjusting the mold dimensions. In this manner the camera body can be made to very close tolerance and the tolerance can be maintained throughout the life of the camera body. The film board is molded from a chopped fiber resin composition that has been found dimensionally stable and amenable to being cast in relatively intricate shapes. The camera body may also be molded from the chopped fiber resin composition.

The quality of a photogrammetric camera is determined by the accuracy of the lens, the flatness of the film and the dimensional stability of the camera. Film flatness has been solved by both expensive and inexpensive methods recently developed and now in practice. Top quality lens construction for large format films has been accomplished by at least a half dozen manufacturers. The main requirements have to do with flat plane focusing and flange focal distances (ffd). The former has been taken care of while the latter have greatly improved but not perfected. If a manufacturer says their lens has a ffd of 149 mm and it turns out to be 148 mm or 150 mm, this error, or any other amount of error, must be accounted for by the ffd built into the camera for that lens. Experience has shown 1 mm or greater errors to be quite common and the camera manufacturer must take care of this by testing the ffd and compensating by building the correct ffd into the camera for that lens. The present invention simplifies this problem by keeping the main body and its focal adjustments always the same, and varying the lens extender of the lens board on the front of the camera. This way the lens extender, being the least expensive part of the camera can be sized for each lens used, including all focal length lenses and can be quickly changed with other focal length lenses.

The third item mentioned above, dimensional stability of the camera, has received the least attention when producing a photogrammetric camera. Every possible part of the camera that can contribute to tolerance variations must be eliminated. This means slides, hinges, stops, clamps, pivots, gears, opening fronts and support bars and nonrigid lens supports with bellows attachment. This obviously means using a camera with minimum parts constructed with materials having the best dimensional stability.

The present invention optimizes these highly desired features. The multistage focusing is very accurate with exactly built in positions for 9 or 10 ranges from 6' to infinity, determined by use of a small hand held range finder of 99% accuracy that has been on the market for several years. For general camera use by amateurs or professionals the distances can be estimated or measured and focus determined by depth of field knowledge. By slanting the lens board and/or the film board one can instantly gain universal focus in any direction.

These and other features of the present invention will be apparent from the detailed description and the drawings that follow.

DESCRIPTION OF THE INVENTION

Figure 1:
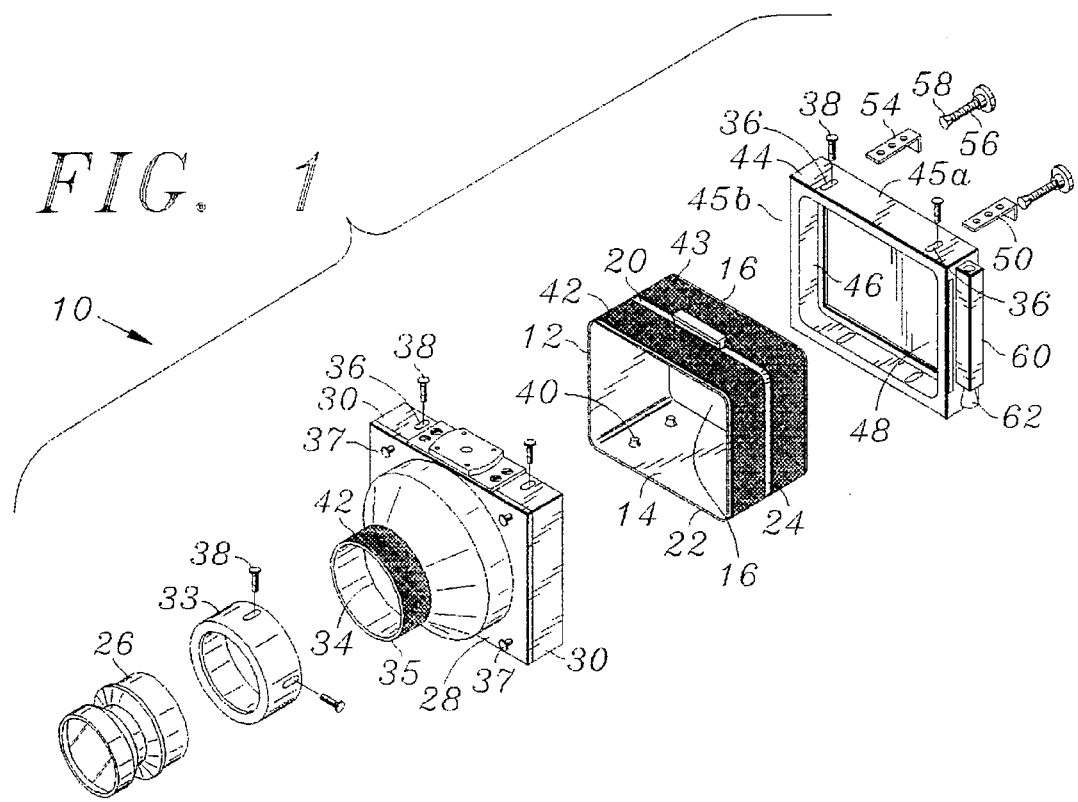
FIG. 1 is an exploded perspective view of the elements of one embodiment of the camera of the present invention.

Referring now to FIG. 1, a camera 10 constructed according to the present invention is illustrated in an exploded perspective view. The camera 10 comprises a camera body 12 formed of a dimensionally stable fiber reinforced resin material. In the embodiment illustrated, the camera body 12 is a generally box-shaped body defining an upper wall 20, a bottom wall 22 and side walls 24. The camera body 12 is open at its front face 14 and rear face 16.

Figure 2:
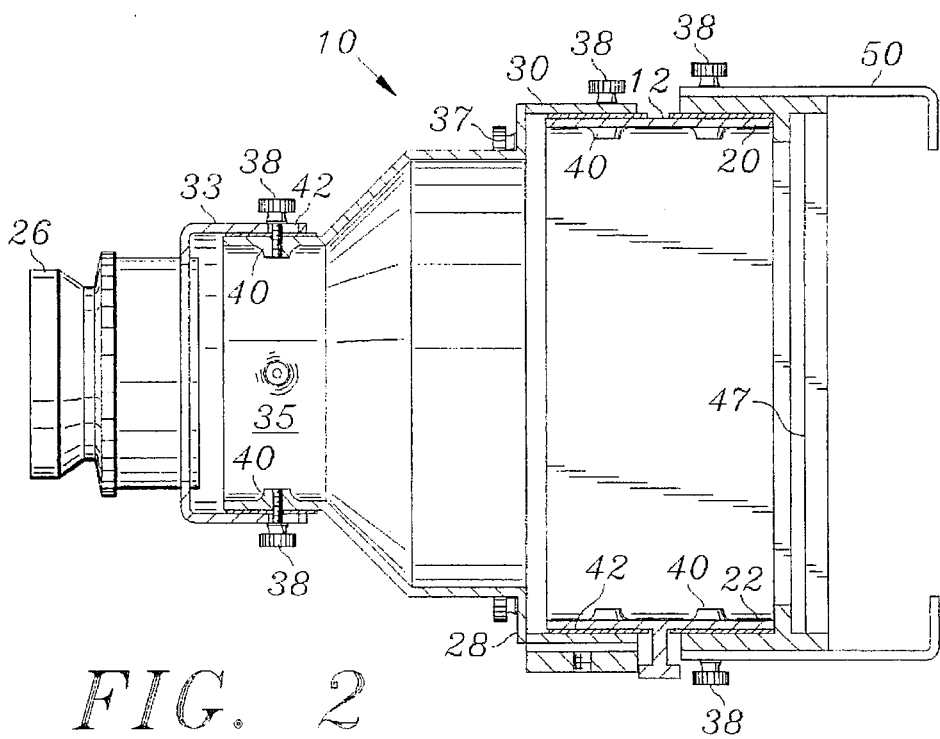
FIG. 2 is a side elevation, partially in section, of the camera of FIG. 1.
Figure 3:
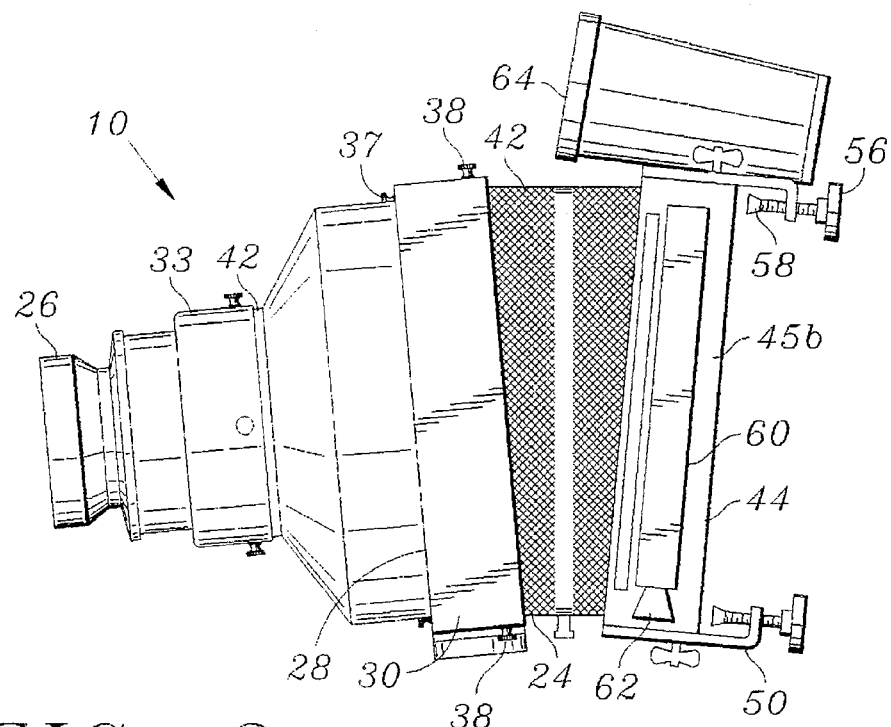
FIG. 3 is a side elevation of the camera of FIG. 1 illustrating the lens board and the film board in tilted positions for vertical depth of field adjustment downward with respect to the lens.
Figure 4:
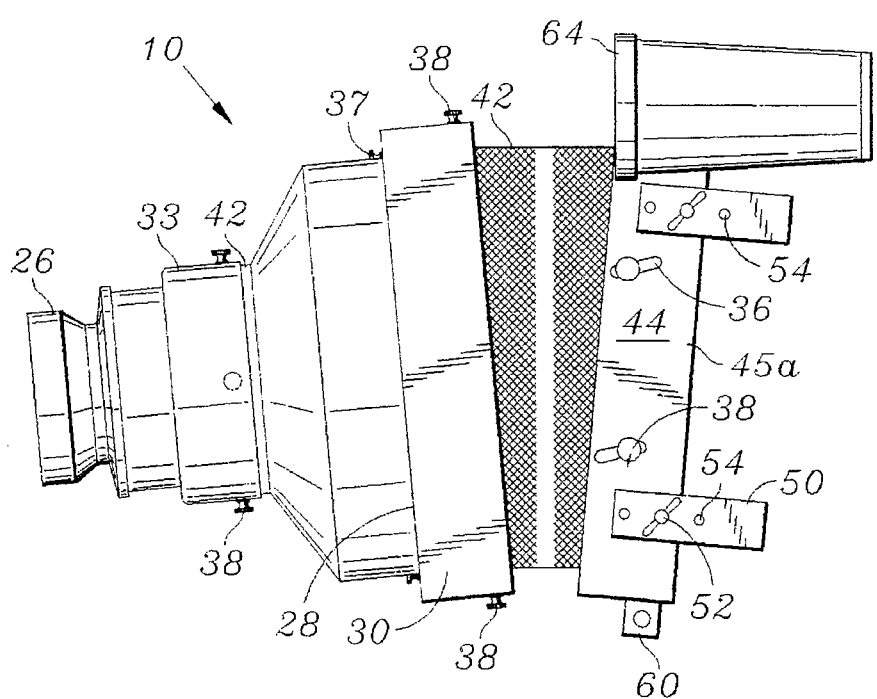
FIG. 4 is a top plan view of the camera of FIG. 1 showing the lens board and the film board in swing positions for horizontal depth of field adjustment to the left with respect to the lens.

A lens board and lens extender assembly carrying a lens body 26 is mounted over the front face 14 of the camera body 12 for axial sliding movement with respect to the camera body and for slanting movement with respect to the horizontal and vertical planes of the lens axis. The lens board and lens extender assembly consists of a frame 30 on which a lens board 28 having a central opening 34 is secured by screws 37. The members of the frame 30 are of sufficient width to define rearwardly extending walls that cooperate to define an interior for slidingly receiving an end portion of the camera body 12. A forwardly extending collar is formed about the central opening 34 to define a lens extender 35. The upper and lower members of the frame 30 are each provided with a pair of elongated slots 36 through which extend locking screws 38 that are threadibly received in a threaded bore of corresponding bosses 40 formed on the inner surfaces of the upper wall 20 and the lower wall 22 of the camera body 12. Once positioned, the movement of the lens board and lens extender assembly is restrained by the enlarged heads of the locking screws 38 that clamp against the wall surfaces adjacent the edges of the elongated slots 36 when the locking screws are drawn down. A strip 42 of compressible fabric is disposed about walls 20, 22, and 24 of the camera body 12 adjacent the front face 14 to define a light seal. Screw holes 43 in the strip 42 allow for the extension therethrough of the locking screws 38. The fabric strip 42 must be both compressible and nonbinding to not interfere with the sliding motion of the lens board 26. For this reason strips of VELCRO® material are preferred for use as the light seal since it is both compressible and nonbinding. The fabric strip 42 is attached to the camera body 12 using a suitable bonding agent, such as an epoxy adhesive. A lens mount 33 fits over the lens extender 35 and a strip of the VELCRO® material is secured about the lens extender to serve as a nonbinding light seal between the lens mount and the extender. The lens mount 33 is axially movable on the lens extender 35. As illustrated in FIGS. 1 and 2, the lens mount 33 is slidable on the lens extender 35 and mounting screws 38 extend through elongated slots 36 in the lens mount to limit the axial travel of the lens mount and to secure the lens mount on the extender. As illustrated in FIGS. 3 and 4, the elongated slots 36 and mounting screws 38 are eliminated and the interfaces of the lens mount 33 and the lens extender 35 are provided with corresponding threads for threadibly mounting the lens mount on the lens extender. The lens mount 33 is rotated to adjust its axial position on the lens extender 35.

A film board 44 consisting of lateral and transverse members, 45a and 45b respectively, is slidably carried on an end of the camera body 12 adjacent the rear face 16 thereof. A portion 46 of the inner facing surfaces of the lateral and transverse members, 45a and 45b, extend perpendicularly inward to act as stop walls for assembly on the camera body 12 and to define the periphery of a window 48 that provides light communication from the lens body 26 for exposing film or for through-the-lens viewing in combination with a ground glass viewing plate (not shown). The lateral members 45a of the film board 44 are each provided with a pair of the elongated slots 36 through which extend the locking screws 38 that are threadibly received in a threaded bore of the corresponding bosses 40 formed on the inner surfaces of the upper wall 20 and the lower wall 22 of the camera body 12. A strip 42 of compressible, nonbinding material is secured about the camera body 12 adjacent the rear face 16 as a light seal between the camera body and the adapter frame 44. One transverse member 45b of the adapter frame 44 is cut away to define a slot 47 for the insertion of a closure member such as a conventional film holder (not shown) or a through-the-lens viewing device of conventional design (not shown) which closes the rear face 16 of the camera body 12. A pair of brackets 50 are adjustably secured to the upper surface of each lateral member 45a of the adapter frame 44 by a screw 52 extending through one of three holes 54 in the bracket 50 into a corresponding threaded seat 55 in the lateral members. Selection of one of the three holes 54 determines the distance of the back edge of the brackets 50 from the film board 44. A clamping bolt 56 having a foot 58 is threadibly carried by the brackets 50 for clamping the closure member in the film board 44. It will be understood that the film board 44 can be mounted on the camera body 12 so that insertion of the closure member is from the right or the left side. A tubular housing 60 is affixed along each of the transverse members 45b and telescopingly receives a support member 62 that can be adjustably positioned between an extended position and a retracted position as shown. The upper end of the housing 60 can serve as a support for a view finder 64, flash attachment or the like.

As previously mentioned dimensional stability of the camera components is essential and therefore, as pointed out in U.S. Pat. No. 4,835,559, particularly good results are achieved using graphite fabric impregnated with epoxy resin. This material is very lightweight and has extremely high strength. In addition, epoxy impregnated graphite fabric possesses excellent dimensional stability and minimal shrinkage which permits manufacturing of the camera parts in extremely close tolerance as required for photogrammetric purposes and for effective light sealing.

The film board 44 is molded from epoxy filled with chopped graphite fiber. The chopped fiber content of the fiber filled epoxy molding composition is between about 55% and 65% by volume with epoxy resin comprising the remaining 35% to 45% by volume. This composition has been dimensionally stable and amenable to being molded into relatively intricate shapes.

The focusing stages of the camera of the present invention are dependent on the relative positions of the lens body 26 carried by the lens board 28 and the film. Very little travel of the lens board 28 and the film board 44 is necessary to position the lens body 26 with respect to the surface of the film to vary the focus stage from infinity to as close as 6 feet. Good results are achieved when the travel of the film board 44 is about 3.5 mm, the lens board and lens extender assembly 26 is 5 mm and the lens mount 33 is 7 mm. Focusing of the camera 10 is simply a matter positioning the lens board and lens extender assembly 26, the lens mount 33 and the film board 44 axially in or out with respect to the camera body 12. The elongated slots 36 limit the movement of the focusing components and the length of the slots determines the location of the in and out positions of the respective focusing components. Focusing the camera for a particular object distance is simply a matter of axially movinging one or more of the focusing components. By selecting combinations of positions for the focusing components, a multiplicity of focusing stages is provided. The following table illustrates the various focusing stages available for focusing on objects 6' to infinity for a normal lens and 4"×5" sheet film.

| Component Position Relative to Camera Body | | | |
| --- | --- | --- | --- |
| | Component Position | | |
| Object Distance/ft. | Film Board | Lens Board/ Extender. | Lens Mount |
| 6 | out | out | out |
| 8 | in | out | out |
| 10 | out | in | out |
| 12 | out | out | in |
| 15 | in | in | out |
| 20 | in | out | in |
| 25 | out | in | in |
| 40 | out ½ slot | in | in |
| infinity | in | in | in |

As is most clearly shown in FIGS. 3 and 4, besides changing the focusing stage of the camera 10, the depth of field can also be increased by slanting, that is, biasing the lens board and lens extender assembly 26 and the film board 44 with respect to their vertical or horizontal axes. Vertical slanting increases depth of focus in the vertical plane while horizontal slanting increases depth of focus in the horizontal plane. The idea of depth of field adjustment by swing and tilt is understood by those skilled in the art and has generally been practiced with focusing cameras having a bellows that allows for the tilt and swing of the lens. Mechanisms employed to achieve tilt and swing in such cameras are complex and add substantially to the cost and the weight of the camera. Depth of field adjustment by slanting focusing components has not been available in simple fixed focus cameras prior to the present invention.

Referring to FIG. 3, the lens board 28 and the film board 44 are illustrated as vertically slanted. The degree of slant is exaggerated for purposes of illustration. Either the lens board 28 or the film board 44 may be slanted or, as illustrated, both may be slanted to achieve the desired adjustment of depth of focus. The lens board 28 or the film board 44, or both, may be slanted upwardly or downwardly with respect to the camera body 12 to achieve vertical depth of field adjustment and is a matter of choice depending upon the desired composition of the photograph. The effect of slanting both the lens board 28 and the adapter frame is additive in a similar fashion to the additive effect achieved in the focusing stages as described above. Depending upon the lens aperture and the slant position of the lens board 28 and the film board 44, depth of field focus can extend from about 10' to infinity FIG. 4 illustrates the lens board 28 and the film board 44 in the horizontal slant position. As in FIG. 3 the slant has also been exaggerated for purposes of illustration. FIG. 4 shows both the lens board 28 and the film board 44 in slant positions for the additive effect achieved by slanting both the lens board and the film board. It will be understood that, as is the case for vertical slant, either the lens board 28 or the film board 44 alone can be placed in the horizontal slant position depending on the desired depth of field adjustment. As in the case of vertical slant, depth of field focus can extend from about 10' to infinity depending on the position of the components and the lens aperture.

The lens extender 35 described above can be cut to various lengths to accommodate lenses of different focal lengths. Thus, the lens extender 35 for a 180 mm or 210 mm lens will necessarily be longer than the lens extender for shorter lenses such as a 150 mm or 135 mm lens. However, the camera body 12 should remain a standardized length, preferably as short as is convenient, to simplify manufacture and reduce the cost, size and weight of the camera of the present invention.

The body 12, the lens board and lens extender assembly and the film board 44 for a 4"×5" camera made according to the present invention have a combined weight of less than one pound and an 8"×10" camera about two pounds. Thus, there is provided an extremely high strength, light weight, dimensionally stable camera capable of utilization in many areas of photography where weight, size and ruggedness coupled with high photo accuracy are wanted. The camera, although highly suited for aerial photogrammetric work, is also suited for accurate photogrammetric and photographic work in a studio, laboratory or the like. With the multistage focusing and depth of field adjustability, the camera of the present invention is highly suited for field work where its flexibility, yet its simple and rugged construction, is highly advantageous.

The invention has been described with reference to the illustrated and presently preferred embodiments. It is not intended that the invention be unduly limited by this disclosure of the preferred embodiment. Instead, it is intended that the invention be defined by the means, and their obvious equivalents, set forth in the following claims.

Having described the invention I claim:

1. A dimensionally stable and rugged multi-stage focus box camera for still photography, particularly adapted for photogrammetric and field use, said camera comprising:

a. a rigid tubular body defining a camera body having an open front and rear face, an upper, lower and side walls;

b. a lens board closing said front face of said camera body, said lens board carrying a lens body;

c. a film board and closure member to close said rear face of said camera body; and d. at least one of said lens board and said film board being slidably movable on said camera body with respect to the longitudinal axis and the vertical and horizontal planes thereof.

2. The multi-stage box camera of claim 1 wherein said lens board includes a central opening, a forwardly extending lens extender surrounding said central opening, a lens mount adapted to carry a lens body axially movably mounted on said lens extender and perpendicularly rearwardly extending top, bottom and side walls defining surfaces for slidably connecting said lens board to said camera body thereby to close said front face of said camera body.

3. The multi-stage box camera of claim 2 wherein said upper and side walls of said lens board each include at least one elongated slot, the upper and side wall of said camera body adjacent said front face each carrying a corresponding boss having a threaded bore opening on the outer surface of said upper and lower wall thereof, said opening being in alignment with its respective elongated slot and a locking screw extending through each said elongated slot threadibly received in said boss to secure said lens board and lens extender assembly and said camera body when turned down, said elongated slots defining the limit of travel of said lens board and lens extender assembly on said camera body.

4. The multi-stage box camera of claim 1 wherein said film board comprises a pair of lateral and transverse members defining inner facing surfaces slidably carried on an end portion of said camera body adjacent the rear face thereof, a portion of the inner facing surfaces of said lateral and transverse members extending inwardly to define the periphery of a window which provides light communication from said lens body through said film board, one transverse member being adapted to permit the insertion and removal of said closure member to close said rear face of said camera body when said closure member is in place.

5. The multi-stage box camera of claim 4 wherein at least said lateral members of said film board include at least one elongated slot, the upper and lower wall of said camera body adjacent said rear face each carrying a corresponding boss having a threaded bore opening on the outer surface of said upper and lower wall thereof, said opening being in alignment with its respective elongated slot and a locking screw extending through each said elongated slot threadibly received in said boss to secure said film board and said camera body when turned down, said elongated slots defining the limit of travel of said film board on said camera body.

6. The multi-stage box camera of claim 1 wherein a strip of non-binding compressible fabric is disposed on the outer surface of said upper, lower and side walls of said camera body adjacent said front and rear face thereof and about said lens extender, said strips lying between said lens board and lens extender assembly and said camera body, between said lens extender and said lens mount between said film board and said camera body to define a light seal which does not interfere with the sliding movement of said lens board and lens extender assembly, said lens mount and said film board.

7. The multi-stage box camera of claim 1 wherein said lens board, said lens mount and said film board are axially movable on said camera body, the relative positions thereof on said camera body determining the distance from said camera at which an object is in focus.

8. The multi-stage box camera of claim 1 wherein said lens board and said film board are movable on said camera body for adjustment of the depth of focus by the slant of said lens board and lens extender assembly and said film board whereby at least one of said lens plate and said film board are in a plane biased with respect to the horizontal plane of said front and rear faces of said camera body.

9. The multi-stage box camera of claim 1 wherein said lens board and said film board are movable on said camera body for adjustment of the depth of focus by the slant of said lens board and lens extender assembly and said film board whereby at least one of said lens plate and said film board are in a plane biased with respect to the vertical plane of said front and rear faces of said camera body.

* * * * *